F. MARCIANDI.
ROTARY DIGGING MACHINE
APPLICATION FILED MAY 25, 1920.
1,433,961.
Patented Oct. 31, 1922.
2 SHEETS—SHEET 1.
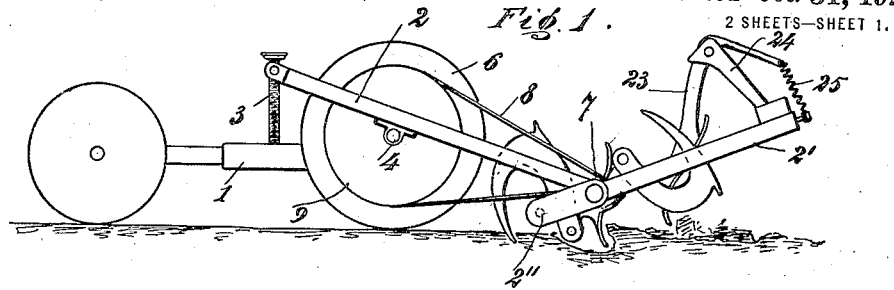
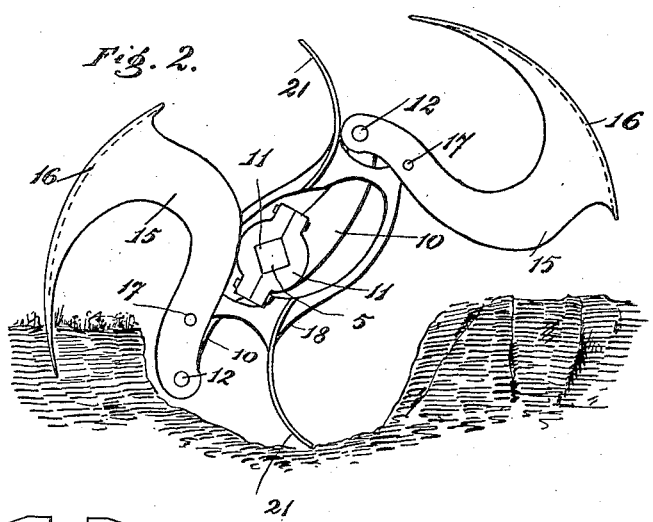
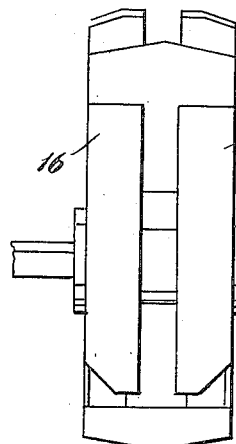
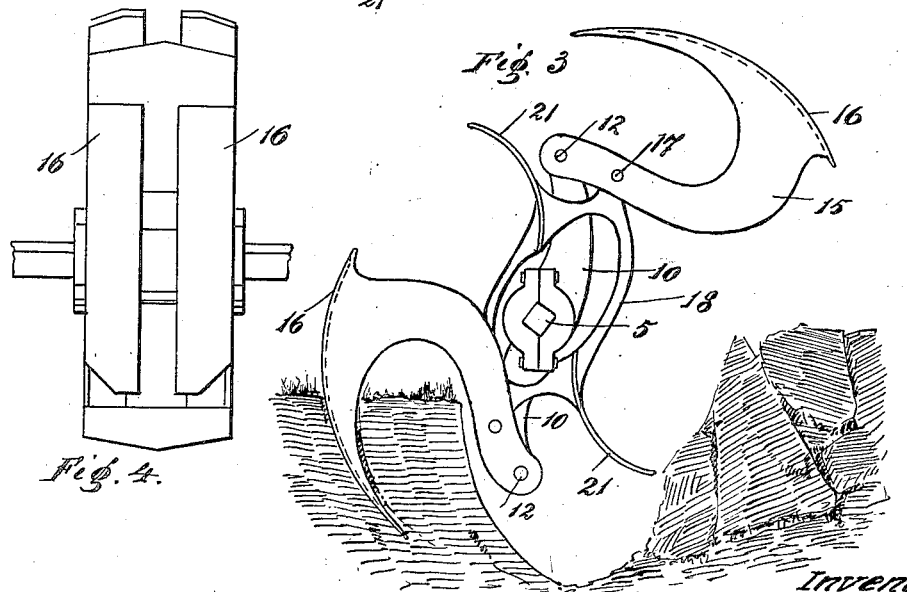
Inventor
F. Marciandi
By H. R. Kerslake
Atty.

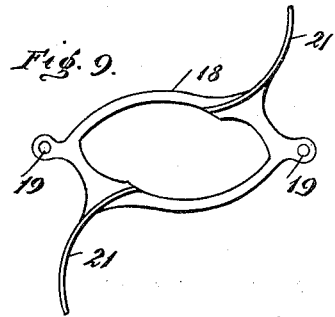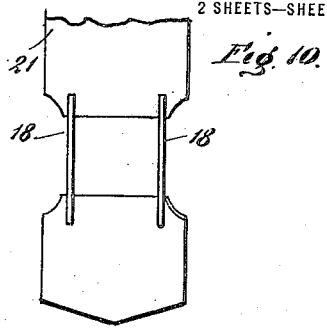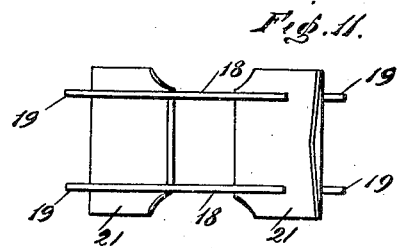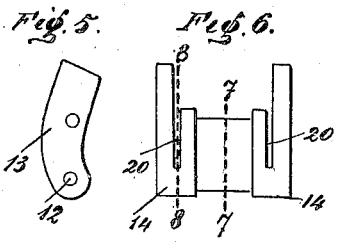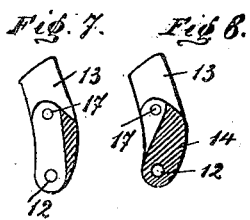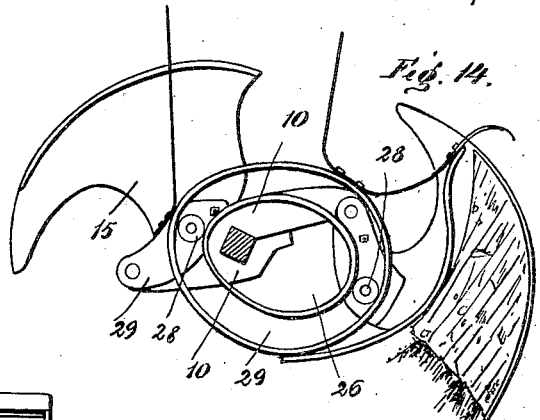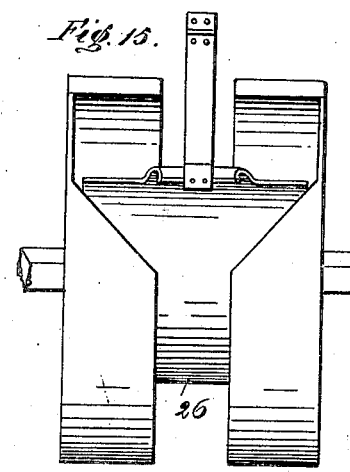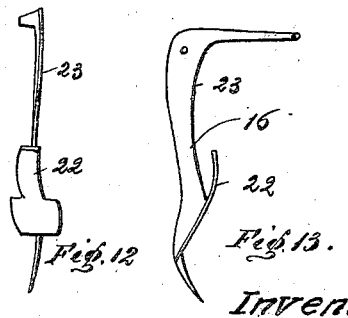

Patented Oct. 31, 1922.

1,433,961

UNITED STATES PATENT OFFICE.

FRANCESCO MARCIANDI, OF RHO, ITALY.

ROTARY DIGGING MACHINE.

Application filed May 25, 1920. Serial No. 384,150.

*To all whom it may concern:*

Be it known that I, FRANCESCO MARCIANDI, subject of the King of Italy, resident of Rho, in the Kingdom of Italy, have invented new and useful Improvements in Rotary Digging Machines, of which the following is a specification.

The subject of the present invention relates to improvements in mechanical digging machine for land cultivating purposes which permits alternative working of two spades that cut the surface sod and penetrate deeply into the ground, from which they separate a layer limited by their curved surfaces, this layer being then carried off, turned upside down and dropped again to the ground.

The annexed drawing shows two forms of the invention by way of example only.

Fig. 1 is a side view of the machine.

Fig. 2 is a view of the rotating digging member at the moment one spade contacts with the ground.

Fig. 3 shows the digging member after it has revolved through a certain angle and one of the spades has penetrated into the ground.

Fig. 4 is a front view of the digging member shown in Fig. 2.

Figure 5 is a side view of one of the elements of the machine.

Figure 6 is a front view of the same.

Figure 7 is a section taken on line 7—7 of Figure 6.

Figure 8 is a section taken on line 8—8 of Figure 6.

Figure 9 is a side view of the actuating frame.

Figures 10 and 11 are front and plan views of the same.

Figure 12 is a front view of the extractor which detaches the earth from the spades.

Figure 13 is a side view of the same.

Figure 14 is a side view of a rotating digging member of modified construction.

Figure 15 is a front view of the same.

The machine essentially comprises a carriage 1 for animal or motor traction. The carriage frame 2 is rigidly secured at its front end to an upright 3 mounted on the carriage. At 4 the frame 2 rests on the hubs of the rear wheels 6 and this frame carries at its rear end the shaft 5. The shaft 5 supports the digging spades and is driven from the carriage wheels 6 through sprocket wheel 9, chain 8 and sprocket pinion 7. The frame extension 2' past the shaft 5 carries the mechanism for loosening the earth that has been cut by the spades; further small frame 2'' is loosely mounted on the shaft 5 and serves to take up the slack of the driving chain 8. The upright 3 is screw-threaded and the frame 2 is secured thereto through the intermediary of a nut threaded on 3, so that the frame can be made to swing about the axis 4 when it is desired either to raise the spade system from the ground or to alter the digging depth of the spades. On the shaft 5 are mounted two arms 10 carrying the spades. These arms may be either keyed to the shaft or secured thereto in the manner shown in Figs. 2 and 3. According to the latter method, the portions of shaft 5 that are to receive the said arms are square in section, and flanged half collars 11 are fixed thereon and held together by means of bolts so as to form the hub of each pair of arms. The arms 10 are bent like pulley or fly-wheel arms and their outer ends carrying pins 12 to which are pivotally secured the portions 14 of connecting blocks 13 (Figs. 8, 9, 10 and 11). Each arm 10 carries one of the connecting blocks 13 and each block 13 has fixed to its ends the side plates of a spade. The plate 15 is suitably formed U-shaped with curved legs. The leg furthest away from the member 13 is L-shaped in section so as to provide a curved cutting blade 16 at right angles to the plate 15 of the spade.

The cutting blade 16 is not curved on an arc having the shaft 5 for its axis, because in such case the spades could not drive into the ground while the carriage is travelling. The blades 16 must be formed with special curves of cycloidal type that will be determined by the practical requirements of the selected type of construction.

The spades, attached to the pins 12, are also pivotally connected to an actuating frame 18 by means of pins 17 which extend through the connecting blocks 13. The frame 18 comprises two elongated rings fitted at their two ends with projecting lugs 19, which are lodged in recesses 20 formed in the members 13 and are perforated in order to receive the pins 17, that are passed through the connecting blocks 13. A hinged suspension is thus obtained for the spades. The actuating frame 18 carries two small spades 21, the duty of which is to dig away a small amount of earth before the spade proper is driven deep into the soil, in order to permit the arms 10 and parts attached thereto to revolve without the main spades meeting with an unduly high resistance.

The frame 2' carries the mechanism for loosening the earth or mud that has been detached from the soil and removed by the blades which form each spade and have the shape of a curved surface divided by a center slot. The extractors—one for each pair of spades—essentially are curved blades 22 suspended mid-way of the length of pointed arms 23 pivotally connected to brackets 24 secured to the frame 2'. The arms 23 are attached to springs 25.

Several pairs of spades may be mounted on the same shaft 5, and be set either all at the same angle or at different angles. The angular velocity of the shaft 5 must be much in excess of that of the axle of the wheels 6.

The working of the machine is as follows:

The motion transmitted by the wheels 6 to the shaft 5 causes the arms 10 to revolve and to carry the spades along with them. As soon as one spade touches the ground with its point and meets with a resistance, this spade turns on the pin 12 carried by the arm 10 and pivots about the pin 17, and thus alters the angle of incidence, formed by the spade points with the ground, until the whole system revolves in fixed relation about the axis of shaft 5 and the small spades 21 as well as the spades proper perform their work.

When one spade, after working, leaves the ground and moves on the opposite side of the shaft 5 and, due to the frame 18 connecting it to the next spade that starts working, alters it orientation, the extractor, comes into action. The extractor or soil loosener enters between the two spades 16 which face each other, and with its curved scraper 22 scratches off the earth that has accumulated on the inner faces of the blades.

According to the construction shown in Figures 14 and 15, an eccentric 26 fixed to the frame by struts 26ª is substituted for the actuating frame 18. Said eccentric is drum shaped and has its end surface provided with an elliptical groove 27 wherein rollers 28 on pins projecting from reinforcing plates 29 fixed to the side plates 15 of the spades run, said reinforcing plates are pivoted on the arms 10.

Having now described my invention and how the same is to be carried out, what I claim as my invention, is:

1. In a digging machine, a rotatable shaft, arms extending outwardly from said shaft, digging blades having shanks, means pivotally connecting the inner ends of the shanks to the outer ends of the arms, and an elongated ring having its end portions pivotally connected to said shanks for causing the blades to turn about their pivots as the shaft rotates.

2. In a rotary digging machine, a rotatable shaft, oppositely disposed outwardly extending arms fixed to said shaft, curved digging blades having shanks, means pivotally connecting the inner ends of the shanks to the outer ends of the arms, an elongated yoke-shaped member having its ends pivotally connected to intermediate portions of the shanks, and ground engaging elements carried by the yoke-shaped member for causing the blades to swing about their pivots during rotation of said shaft.

3. In a rotary digging machine, a rotatable shaft, oppositely disposed outwardly extending arms fixed to said shaft, curved blades having shanks, means pivotally connecting the inner ends of the shanks to the outer ends of said arms, each of said blades and its respective shank forming a substantially U-shaped member, a yoke-shaped member surrounding the shaft and provided with oppositely disposed projecting ears, means pivotally connecting said ears to intermediate portions of the shanks, and ground engaging elements carried by the yoke-shaped member for causing said blades to swing in their pivots.

4. In a rotary digging machine, a rotatable shaft, oppositely extending arms fixed to said shaft, connecting members having recessed inner ends engaging the outer ends of the arms, pivot pins connecting the recessed ends of the connecting members to the outer ends of said arms, said connecting members being provided with slots, digging blades fixed to said connecting members, a yoke-shaped member provided with oppositely extending ears which extend into the slots of the connecting members, means pivotally connecting said ears to said connecting members, and ground engaging elements fixed to said yoke-shaped member for causing the blades to swing about their pivots as the shaft rotates.

5. In a rotary digging machine, a rotatable shaft, oppositely extending arms fixed to said shaft, curved blades having shanks, means pivotally connecting said shanks to the outer ends of said arms, a member connecting said shanks for causing the blades to swing about their pivots, ground engaging elements carried by said member, said blades being arranged in pairs and the blades of each pair being spaced apart, and a soil loosening member projecting into the path of movement of said blades and adapted to enter the spaces between the blades of each pair for causing soil loosened by the blades to be extracted from the blades.

In testimony whereof I affix my signature.

FRANCESCO MARCIANDI.